Figure 1:
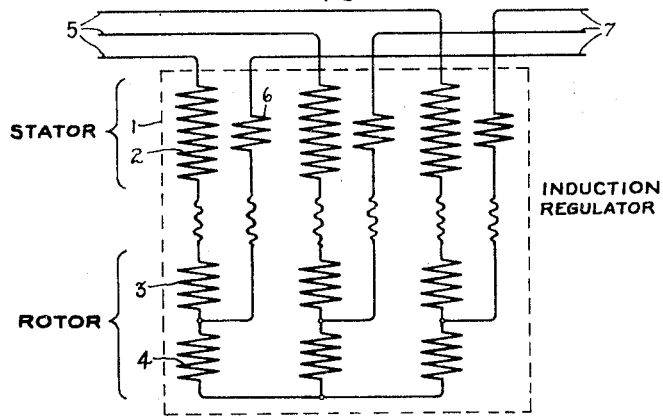

April 26, 1949.  E. C. BARWICK  2,468,536

INDUCTION REGULATOR

Filed June 13, 1947

Inventor:
Emerson C. Barwick,
by Ernest C. Britton
His Attorney.

Patented Apr. 26, 1949

2,468,536

UNITED STATES PATENT OFFICE 2,468,536

INDUCTION REGULATOR

Emerson C. Barwick, Rugby, England, assignor to General Electric Company, a corporation of New York Application June 13, 1947, Serial No. 754,541
In Great Britain October 19, 1945

Section 1, Public Law 690, August 8, 1946
Patent expires October 19, 1965

3 Claims. (Cl. 323—44)

This invention relates to induction regulators and more particularly to improvements in polyphase induction regulators for controlling the speed of electric motors.

For the speed control of polyphase alternating current commutator motors of the stator fed type, it is necessary to apply to the commutator brushes a voltage which is substantially constant in phase but variable in magnitude. If the motor is required to operate at speeds above and below its synchronous speed, the variable voltage applied to the brushgear must be adjustable between negative and positive limits. Further, in order to provide means of improving the power factor of the motor, it is also necessary for the voltage applied to the motor brushes to have a component substantially constant in magnitude, in quadrature time phase relative to the variable magnitude voltage. Thus the voltage required comprises one component of constant phase and variable magnitude and a second component of substantially constant phase and magnitude.

A voltage having the characteristics described above has, in the past, been obtained by using two polyphase induction regulators of conventional electrical design having their rotating members mounted on a common shaft or mechanically coupled in some other way. The primary windings of the two regulators are connected in parallel to a source of alternating current in such a way that movement of the regulator rotors advances the phase of the secondary voltage of one regulator and retards the phase of the secondary voltage of the other regulator. If the two regulators are designed to give equal secondary voltages and the two secondary windings are connected in series, an output voltage from the combination of regulators can be obtained which will be constant in phase, and variable in magnitude from a maximum in one sense, through zero to a maximum in the opposite sense. In order to introduce the quadrature component of voltage an additional winding has been provided on one of the regulator members which carries the primary winding, or on the stator of the commutator motor, or an auxiliary transformer has been provided.

In accordance with this invention, I provide a single induction regulator having series connected stator and rotor windings connected to a source of supply, wherein the rotor winding, in each phase, is divided into two sections, to the common junction of which is connected one end of a secondary winding located on the stator and having its other end serving as an output terminal, the relative positions and numbers of turns of the stator and rotor windings being such as to obtain a variable output voltage having a component of variable magnitude and substantially fixed phase position, and a second component either of constant magnitude and of fixed phase position displaced from that of the variable component or of zero magnitude.

It is not essential for the two parts of the primary winding which are wound on the rotor to be co-axial or to have the same numbers of turns. The determination of the relationship between the two parts depends mainly on the magnitude and phase of the output voltage required relative to the supply voltage.

It is known to provide an induction regulator with a primary winding divided into two sections, one section wound on the stator and the other section wound on the rotor, and to provide a secondary winding on the stator, one end of which is connected to the junction between the two parts of the primary winding. This arrangement is uneconomical when the maximum output voltage required is only a small fraction of the supply voltage to the regulator.

By connecting the secondary winding to an intermediate point of that part of the primary winding situated on the rotor, as described above with reference to the present invention, a much wider choice of output voltage relative to the input voltage is economically possible.

An object of the invention is to provide a new and improved polyphase induction regulator.

Another object of the invention is to provide an induction regulator having a variable output voltage which includes a component of variable magnitude and substantially fixed phase position and a second component either of constant magnitude and a fixed phase position displaced from that of the variable component or of zero magnitude.

A further object of the invention is to provide a new and improved controller for electric motors.

The invention will be better understood from the following description taken in connection with the accompanying drawing, and its scope will be pointed out in the appended claims.

Figure 2:
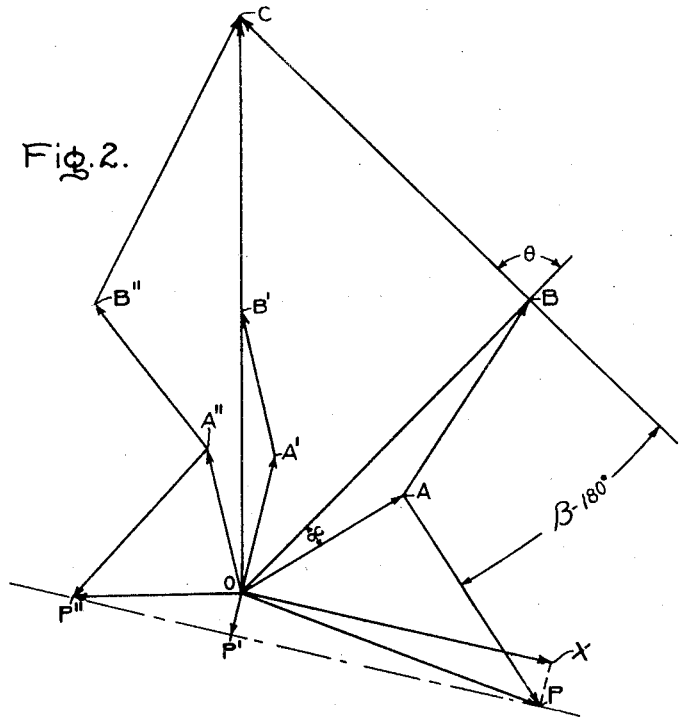

In the drawings Fig. 1 shows diagrammatically the windings and internal connections of a three-phase regulator according to the invention, and Fig. 2 is a vector representation of the voltages induced in the various sections of the windings of one phase, for three different positions of the regulator rotor.

In Fig. 1, I represents a three-phase induction regulator having a primary winding divided into three sections per phase, 2, 3 and 4. Section 2 is wound on the stator and sections 3 and 4 are wound on the rotor. The primary winding is supplied from the three-phase source of alternating current 5. The secondary winding 6 is wound on the stator. One end of the secondary winding is connected to the junction of sections 3 and 4 of the primary winding and the other end of the secondary winding is connected to the output cables 7.

For the purpose of the vector diagram in Fig. 2 relating to a regulator according to my invention, it will be assumed that sections 3 and 4 of the primary winding have differing numbers of turns and are not co-axial. It will also be assumed that these two sections of primary winding together have the same effective number of turns (after allowing for the out-of-alignment of the two sections 3 and 4) as section 2 of the primary winding. It will further be assumed that the secondary winding 6 has a greater number of turns than section 4 of the primary winding and that it is not co-axial with section 2 of the primary.

In Fig. 2 OC represents the supply voltage applied to one phase of the primary winding, and is assumed to be constant. Vectors OA, AB and BC represent the voltages induced in the three sections of the primary winding 4, 3 and 2 respectively. Angle $\alpha$ is the electrical angle by which the resultant of OA and AB viz. OB is out of line with voltage OA, and is independent of the position of the rotor. Angle $\theta$ is the angle by which the resultant of OA and AB viz. OB is out of line with voltage BC, and varies with the position of the rotor.

Vector AP is the voltage induced in the secondary winding 6. The direction of AP is determined by the position of the rotor i. e. on angle $\theta$, and by the angle $\beta$ which corresponds to the amount by which windings 2 and 6 are out of line, and is independent of the rotor position. In the diagram given, $\alpha$ and $\beta$ have been made to differ from each other by 180°. The output voltage is therefore OP which is the vector sum of OA and AP.

If the rotor is now moved in a direction such as to reduce angle $\theta$ the output voltage OP is reduced. A', B' and P' are the positions to which A, B and P move when $\theta$ is made zero, which gives an output voltage of OP'. Further movement of the rotor so as to make $\theta$ become negative causes A, B and P to move to some other positions, such as A", B" and P".

It can be shown that the locus of P is a straight line for the example given, and that therefore the output voltage contains the two components required viz. a variable magnitude component of constant phase which can be represented by OX and a component constant in magnitude and phase which is OP'.

By changing the relative numbers of turns in the various sections of winding and the angles $\alpha$ and $\beta$ other loci of the end of the output voltage vector OP can be obtained. If OB and BC are made unequal, then the locus of P will become a curve. If OA and AP are made equal, then the locus of P will pass through O. If $\alpha$ and $\beta$ do not differ by 180° and are not equal, then the magnitude of OP corresponding to equal and opposite values of $\theta$ will differ.

By selection of suitable numbers of turns in the various sections of the primary winding and in the secondary winding, and by choosing suitable values for the angles between the above windings, close control of the output voltage characteristic is possible.

While I have hereinbefore referred to the specific positions of the several windings as being on the stator and rotor, it will be understood that the terms "stator" and "rotor" are interchangeable, and those windings which have been described as located on the stator can equally well be located on the rotor when these windings, which have been referred to as being located on the rotor, are positioned on the stator.

While there has been shown and described a particular embodiment of this invention, it will be obvious to those skilled in the art that various changes and modifications can be made therein without departing from the invention, and therefore it is intended in the appended claims to cover all such changes and modifications as fall within the true spirit and scope of the invention.

What I claim as new and desire to secure by Letters Patent of the United States is:

1. An induction regulator having a stator and a rotor, a pair of windings on said stator and a second pair of windings on said rotor, said regulator having an input circuit comprising one stator winding and both rotor windings connected in series, said regulator having an output circuit connected to the junction between the two rotor windings and including therein the remaining stator winding.

2. A polyphase induction regulator having a stator and a rotor, a pair of windings per phase on said stator, a pair of windings per phase on said rotor, a neutral point, one rotor winding of each phase being connected directly to said neutral point, the remaining rotor windings being connected respectively in series with the first-mentioned rotor winding of their respective phases and with one of the stator windings of their respective phases, and connections between each of the remaining stator windings and the junctions between the two rotor windings of their respective phases.

3. A three-phase induction regulator having a rotor and a stator, each phase of the regulator having a pair of phase displaced stator windings and a pair of phase displaced rotor windings, said regulator having an input circuit and an output circuit, each phase of one of said circuits including in series one stator winding and both rotor windings, the other circuit of each phase including the remaining stator winding, said circuits being electrically connected together at the junction of the two rotor windings.

EMERSON C. BARWICK.

REFERENCES CITED

The following references are of record in the file of this patent:

UNITED STATES PATENTS

| Number | Name | Date |
|---|---|---|
| 1,423,926 | Faccioli | July 25, 1922 |
| 1,645,724 | Springer | Oct. 18, 1927 |
| 1,919,960 | Miyamoto | July 25, 1933 |

FOREIGN PATENTS

| Number | Country | Date |
|---|---|---|
| 341,903 | Great Britain | Jan. 23, 1931 |